(12) United States Patent
Van Walsem et al.

(10) Patent No.: US 7,795,376 B2
(45) Date of Patent: Sep. 14, 2010

(54) SINGLE SOLVENT POLYMER EXTRACTION METHODS

(75) Inventors: Johan Van Walsem, Acton, MA (US); Erik Anderson, Somerville, MA (US); John Licata, Wakefield, MA (US)

(73) Assignee: Metabolix Inc., Cambridge, MA (US)

( * ) Notice: Subject to any disclaimer, the term of this patent is extended or adjusted under 35 U.S.C. 154(b) by 0 days.

(21) Appl. No.: 12/497,362

(22) Filed: Jul. 2, 2009

(65) Prior Publication Data

US 2010/0016544 A1    Jan. 21, 2010

Related U.S. Application Data

(63) Continuation of application No. 11/220,119, filed on Sep. 6, 2005, now Pat. No. 7,576,173.

(60) Provisional application No. 60/609,280, filed on Sep. 13, 2004.

(51) Int. Cl.
*C08F 6/00* (2006.01)

(52) U.S. Cl. .............. 528/480; 264/2.6; 264/4; 264/4.1; 435/135; 528/271; 528/272; 528/485; 568/842; 568/864; 568/899; 568/918

(58) Field of Classification Search .......... 264/2.6, 264/4, 4.1; 435/135; 528/271, 272, 480, 528/485; 568/842, 864, 899, 918
See application file for complete search history.

(56) References Cited

U.S. PATENT DOCUMENTS

| | | | |
|---|---|---|---|
| 5,894,062 A | 4/1999 | Lindell | |
| 5,942,597 A | 8/1999 | Noda et al. | |
| 6,388,043 B1 | 5/2002 | Langer et al. | |
| 2005/0239998 A1* | 10/2005 | Kinoshita et al. | ........... 528/272 |

FOREIGN PATENT DOCUMENTS

| | | |
|---|---|---|
| EP | 1739182 | 1/2007 |
| WO | WO-96/06179 | 2/1996 |
| WO | WO-97/07229 | 2/1997 |
| WO | WO-98/46783 | 10/1998 |
| WO | WO-2005/052175 | 6/2005 |

OTHER PUBLICATIONS

First Office Action for Chinese Patent Application No. 200580038924.X issued Nov. 6, 2009.
International Search Report and Written Opinion for PCT/US2005/031624 mailed Jan. 11, 2006.
EP Communication for European Patent Application No. 05793090.1 mailed Jun. 18, 2009.
EP Communication for European Patent Application No. 05793090.1 mailed Jun. 11, 2008.
Examination Report issued in Australian Patent Application No. 2005285271 and dated Apr. 27, 2010.

* cited by examiner

*Primary Examiner*—Terressa M Boykin
(74) *Attorney, Agent, or Firm*—Foley & Lardner LLP

(57) ABSTRACT

A method of isolating a PHA, includes combining the PHA, a first solvent and a second solvent to form a combination, the first solvent being capable of forming an azeotrope with the second solvent; and heating the combination to form the azeotrope of the first and second solvents.

17 Claims, 1 Drawing Sheet

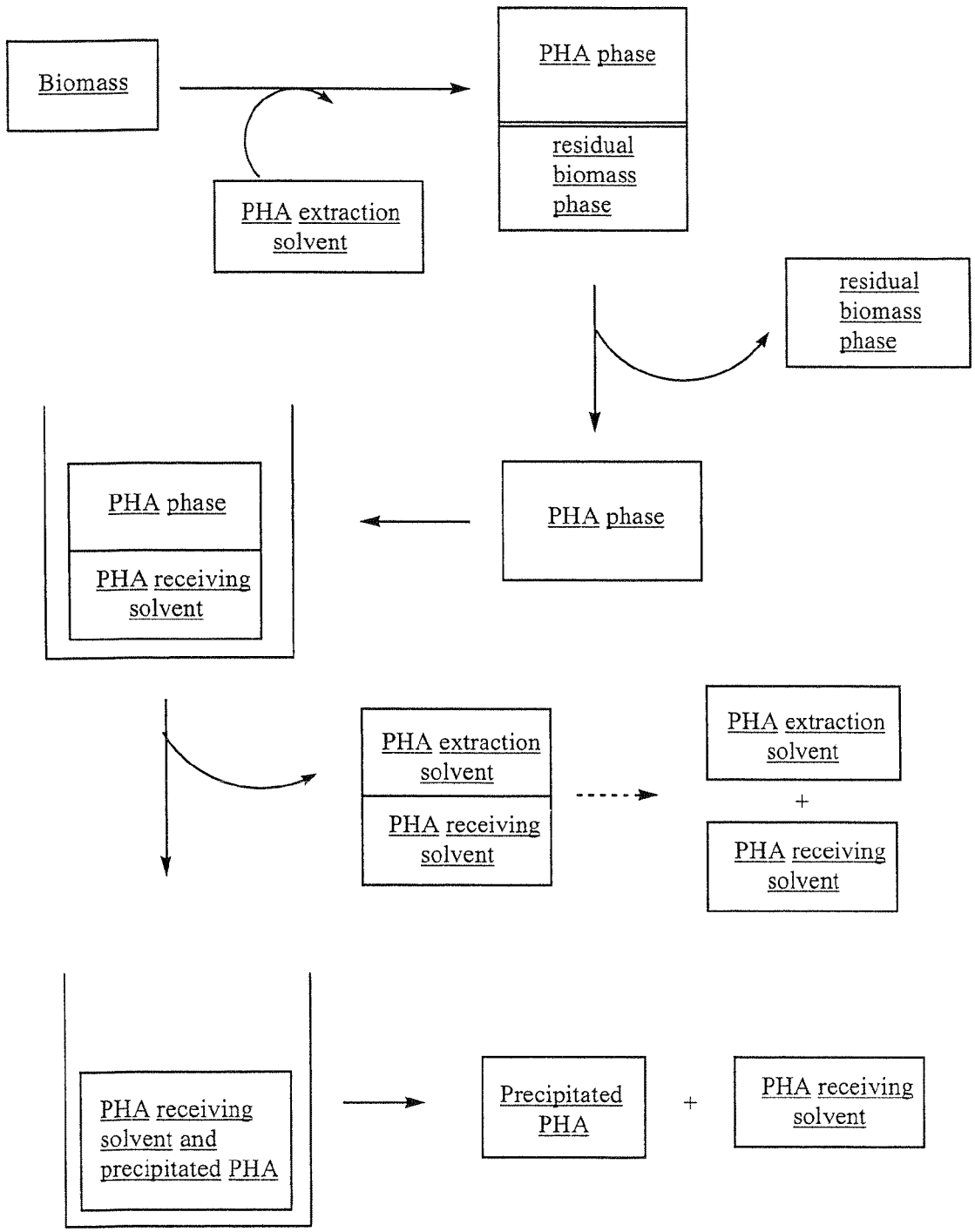

SINGLE SOLVENT POLYMER EXTRACTION METHODS

RELATED APPLICATIONS

This application is a continuation of U.S. application Ser. No. 11/220,119, filed Sep. 6, 2005, now U.S. Pat. No. 7,576,173 which claims the benefit of U.S. Provisional Application No. 60/609,280, filed on Sep. 13, 2004. The entire teachings of the above application(s) are incorporated herein by reference.

TECHNICAL FIELD

This invention relates to polymer extraction methods.

BACKGROUND

A polyhydroxyalkanoate ("PHA") can be extracted from biomass having cells that contain the PHA. Generally, this process involves combining the biomass with a solvent for the PHA, followed by heating and agitation. Typically, this provides a system including two phases, with one phase being a solution that contains the solvent and the PHA, and the other phase containing residual biomass with cells containing a reduced amount of the PHA. Usually, the two phases are separated, and the PHA is then removed from the solvent.

SUMMARY

In general, the invention relates to polymer extraction methods.

In one aspect, this invention relates to a method of isolating a PHA, the method includes: combining the PHA, a first solvent and a second solvent to form a combination, the first solvent being capable of forming an azeotrope with the second solvent; and heating the combination to form the azeotrope of the first and second solvents.

In another aspect, this invention features a method of isolating a PHA, the method includes: combining the PHA, a first solvent and a second solvent to form a combination, the first solvent being capable of forming an azeotrope with the second solvent; and after forming the combination, forming granules of the PHA.

In a further aspect, this invention features a method of isolating a PHA, the method includes: combining the PHA, a first solvent and a second solvent to form a combination, the first solvent having a higher boiling point than the second solvent; and heating the combination to a temperature less than the boiling point of the second solvent to remove at least some of the PHA from the combination.

In one aspect, this invention features a method of isolating a PHA, the method includes: combining the PHA, a first solvent and a second solvent to form a combination, the first solvent having a higher boiling point than the second solvent; and heating the combination to a temperature less than the boiling point of the second solvent to substantially remove the first solvent from the combination.

In another aspect, this invention features a method of isolating a PHA, the method includes: combining the PHA, a first solvent and a second solvent to form a combination, the first solvent being capable of forming an azeotrope with the second solvent; heating the combination to form a vapor mixture comprising the first and second solvents; and condensing the vapor mixture to form a liquid comprising first and second phases, the first phase of the liquid being substantially free of the first solvent, the second phase of the liquid being substantially free of the second solvent.

In a further aspect, this invention features a method of isolating a PHA, the method includes: combining the PHA, a first solvent and a second solvent to form a combination, the first solvent having a higher boiling point than the second solvent; heating the combination to form a vapor mixture comprising the first and second solvents; and condensing the vapor mixture to form a liquid comprising first and second phases, the first phase of the liquid being substantially free of the first solvent, the second phase of the liquid being substantially free of the second solvent.

Embodiments can include one or more of the following features.

The first solvent can be selected from the group consisting of MIBK, butyl acetate, ethyl acetate, cyclopentanone, and cyclohexanone. In certain embodiments, the first solvent is MIBK.

The second solvent can include water.

Heating the combination can substantially remove the first solvent from the combination.

The azeotrope can form at a temperature below the boiling point of the first solvent and below the boiling point of the second solvent.

The method can further include forming granules of the PHA. The PHA granules have a bulk density of at least about 0.25 kg/m$^3$.

The method can include, before heating, combining the PHA and the first solvent to form a first combination; and combining the first combination with the second solvent to form the combination.

The method can include, before forming the PHA granules, heating the combination to substantially remove the first solvent, thereby forming a second combination comprising the PHA and the second solvent; and reducing the temperature of the second combination.

The first solvent can be capable of forming an azeotrope with the second solvent.

Heating the combination can form the azeotrope of the first and second solvents.

The combination can be heated to a temperature below a boiling point of the first solvent and below a boiling point of the second solvent.

The combination can be heated to a temperature below a boiling point of the first solvent and below a boiling point of the second solvent.

In one aspect, this invention features a method of isolating a PHA, the method includes: combining the PHA, a first solvent, a second solvent, and a third solvent to form a combination, the first solvent and the second solvent being capable of forming an azeotrope with the third solvent; and after forming the combination, forming granules of the PHA.

Embodiments can include one or more of the following features.

Heating the combination can substantially remove the first solvent and the second solvent from the combination.

Heating the combination can form a ternary azeotrope of the first solvent, the second solvent, and the third solvent.

Heating the combination can form a binary azeotrope of the first solvent and the third solvent and a binary azeotrope of the second solvent and the third solvent.

The azeotrope can form at a temperature below the boiling point of the first solvent, below the boiling point of the second solvent, and below the boiling point of the third solvent.

The first solvent can be selected from the group consisting of MIBK, butyl acetate, ethyl acetate, cyclopentanone, and cyclohexanone. In certain embodiments, the first solvent can be MIBK.

The first solvent can be miscible with the second solvent.

The ratio of the second solvent to the first solvent can be less than about 0.10.

The PHA can have a solubility in the second solvent of less than about 0.2 percent of the PHA at 20° C.

The second solvent can include n-heptane.

The third solvent can include water.

The granules of the PHA can have a bulk density of at least about $0.25$ kg/m$^3$.

The method can include, before forming the PHA granules, heating the combination to substantially remove the first solvent and the second solvent, thereby forming a second combination comprising the PHA and the third solvent; and reducing the temperature of the second combination.

The method can include, before heating, combining the PHA, the first solvent, and the second solvent to form a first combination; and combining the first combination with the third solvent to form the combination.

The method can include heating (e.g., at a temperature below the boiling point of the first solvent, below the boiling point of the second solvent, and below the boiling point of the third solvent) the combination to form a vapor mixture comprising the first, second, and third solvents; and condensing the vapor mixture to form a liquid comprising first and second phases, the first phase of the liquid being substantially free of the first and second solvents, the second phase of the liquid being substantially free of the third solvent.

Other embodiments can include one or more features described elsewhere.

In some embodiments, a solvent used to extract a PHA can have a higher boiling point than a solvent used to precipitate a PHA.

In certain embodiments, the methods can use solvent(s) in a relatively efficient manner. For example, a relatively high percentage of the solvent(s) used in the methods can be recovered (e.g., for re-use).

In some embodiments, solvents can be recovered by physical separation of solvent mixtures (e.g., by decanting).

In some embodiments, solvent(s) can be removed from the PHA at a pressure corresponding to a relatively modest vacuum and at a relatively low temperature thereby minimizing the need for performing a relatively energy intensive distillation.

In some embodiments, the isolated PHAs can have a relatively high filterability.

In some embodiments, the isolated PHAs can have desirable cake washing characteristics.

In some embodiments, the isolated PHAs can be relatively free flowing and/or relatively incompressible and/or relatively nonfibrous and/or can have a relatively high bulk density and/or can have a relatively large granule diameter, thereby facilitating further purification of the PHAs by methods that exploit gravity conditions.

In certain embodiments, the methods can extract PHA from biomass in relatively high yield. In some embodiments, a relatively high yield of PHA can be extracted from biomass without using multiple stages (e.g., with a one-stage process).

In some embodiments, the methods can extract relatively pure polymer (e.g., PHA).

In some embodiments, the methods can have a reduced environmental impact.

In certain embodiments, the methods can extract the polymer at relatively high space velocity (e.g. at high throughput with overall low residence time in process equipment).

In certain embodiments, the methods can result in a relatively small amount of undesirable reaction side products (e.g., organic acids). This can, for example, decrease the likelihood of corrosion or other undesirable damage to systems used in the methods and/or extend the useful lifetime of such systems.

In certain embodiments, the methods can provide relatively high solvent recovery.

In some embodiments, a relatively low viscosity residual biomass is formed.

The details of one or more embodiments of the invention are set forth in the accompanying drawings and the description below. Other features and advantages of the invention will be apparent from the description and drawings, and from the claims.

DESCRIPTION OF DRAWINGS

The FIGURE is a flow diagram of an embodiment of a method of extracting PHA from a biomass containing PHA.

DETAILED DESCRIPTION

The FIGURE is a flow diagram of an embodiment of a process for extracting PHAs from a biomass having one or more PHAs contained within other non-PHA, biomass-associated materials (e.g., cellular matter, water). The biomass is contacted with a PHA extraction solvent to form a mixture. The PHA extraction solvent is capable of forming an azeotrope (e.g., a minimum boiling azeotrope) with a PHA receiving solvent that is introduced later in the process. The mixture is agitated (e.g., stirred) to provide a combination that includes two phases: the "PHA phase" and the "residual biomass phase." The PHA phase is formed of a solution containing the extracted, solubilized PHAs, the PHA extraction solvent, and, in some instances, trace amounts of the non-PHA, biomass-associated materials. The residual biomass phase is formed of a residual biomass having a reduced PHA content, the non-PHA, biomass-associated materials and, in some instances, a carry over portion of the PHA extraction solvent. The PHA phase and the residual biomass are then separated. In some embodiments, the two phases can be separated using an appropriate device that exploits centrifugal force to facilitate the separation (e.g. disc centrifuge, bowl centrifuge, decanter centrifuge, hydroclone, countercurrent centrifugal contactor). Optionally, one or more solvents can be added to the device that exploits centrifugal force to facilitate the separation.

The PHA phase is introduced into a system (e.g., a distillation or evaporation apparatus) containing the PHA receiving solvent to form a second combination. The system is maintained at a temperature and pressure such that the PHA extraction solvent of the PHA phase and a portion of the PHA receiving solvent are removed from the second combination in the gaseous state as an azeotropic mixture. The gaseous azeotropic mixture is condensed to form a third combination that includes the PHA extraction solvent and the PHA receiving solvent in the liquid state. When the PHA extraction solvent is immiscible with the PHA receiving solvent (e.g., when the PHA extraction solvent and the PHA receiving solvent form a heterogeneous azeotrope), the two solvents forming the third combination can be physically separated (e.g., by decanting one solvent away from the other). Precipitation of the PHA in the PHA receiving solvent occurs when the PHA extraction solvent is removed (e.g., substantially removed) from the second combination as described above. The solid PHA is separated from the PHA receiving solvent (e.g., by filtration). Optionally, the isolated PHA can be further washed with one or more additional solvents to remove impurities that still may be present.

In general, the PHA extraction solvent and the PHA receiving solvent can have one or more of the following properties:

(1) the PHA extraction solvent is capable of dissolving the PHA to form a substantially uniform solution at the molecular level;

(2) the PHA receiving solvent has a relatively low solvent power for the PHA to be isolated; and (3) the PHA extraction solvent forms an azeotrope with the PHA receiving solvent when the PHA extraction solvent/PHA receiving solvent combination is brought to its boiling point (e.g., by heating the combination).

In some embodiments, the PHA extraction solvent forms a heterogeneous azeotrope with the PHA receiving solvent when the PHA extraction solvent/PHA receiving solvent combination is brought to its boiling point (e.g., by heating the combination). The vapor phase can subsequently form two immiscible liquid layers when it is condensed (e.g. by cooling the vapor phase with a condenser).

As used herein, the term "azeotrope" refers to a constant boiling, liquid mixture of two or more components that cannot be separated by fractional distillation into its substantially pure, constituent components, regardless of the efficiency of the fractioning column. In some embodiments, the PHA extraction solvent forms a minimum boiling azeotrope with the PHA receiving solvent, in which the boiling point of the PHA extraction solvent/PHA receiving solvent combination is lower than both the boiling point of the substantially pure PHA extraction solvent and the substantially pure PHA receiving solvent. In some embodiments, the PHA extraction solvent forms a maximum boiling azeotrope with the PHA receiving solvent, in which the boiling point of the PHA extraction solvent/PHA receiving solvent combination is higher than both the boiling point of the substantially pure PHA extraction solvent and the substantially pure PHA receiving solvent.

In general, the number of PHA extraction solvents and PHA receiving solvents can be selected as desired. As an example, a single PHA extraction solvent can form a binary azeotrope (e.g., a minimum boiling azeotrope) with a single PHA receiving solvent. As another example, a single PHA extraction solvent can form a ternary azeotrope (e.g., a minimum boiling azeotrope) with two different PHA receiving solvents. As a further example, two different PHA extraction solvents can form a ternary azeotrope (e.g., a minimum boiling azeotrope) with a single PHA receiving solvent. In some embodiments two or more PHA extraction solvents (e.g., three PHA extraction solvents, four extraction solvents, five extraction solvents) can form a multicomponent azeotrope (e.g., four components, five components, six components, seven components, eight components, nine components, ten components) with two or more PHA receiving solvents (e.g., three PHA receiving solvents, four receiving solvents, five receiving solvents).

The choice of a PHA extraction solvent/PHA receiving solvent combination depends on the given PHA to be purified and the desired boiling point of PHA extraction solvent/PHA receiving solvent azeotrope. Without wishing to be bound by theory, it is believed that appropriate PHA extraction and receiving solvents for a given PHA can be selected by substantially matching appropriate solvation parameters (e.g., dispersive forces, hydrogen bonding forces and/or polarity) of the given PHA and solvents. For example, a relatively nonpolar PHA can be matched with a relatively nonpolar PHA extraction solvent. Again, without wishing to be bound by theory, it is believed that appropriate PHA extraction and receiving solvents for a given PHA can be selected by determining which of the candidate PHA extraction solvent/PHA receiving solvent combinations forms an azeotrope having the desired boiling point. In some embodiments, the desired azeotropic boiling point can be selected on the basis of the melt temperature ($T_M$) of the PHA to be isolated. Solvation parameters are disclosed, for example, in Hansen, Solubility Parameters—A User's Handbook, CRC Press, NY, N.Y. (2000). Azeotropic data are disclosed, for example, in Weast, R. C., ed., CRC Handbook of Chemistry and Physics, $63^{rd}$ Edition, CRC Press, Boca Raton, Fla. (1982) and references described therein.

The PHA receiving solvent can be water, or a relatively highly polar or nonpolar organic solvent. Organic PHA receiving solvents can include, e.g., alkanes or simple alcohols (e.g., methanol or ethanol). In some embodiments, the solubility of the PHA in the PHA receiving solvent is less than about 0.2 percent (e.g., less than about 0.1 percent) of the PHA at 20° C.

In general, the PHA extraction solvent can be an organic solvent. PHA extraction solvents can be, for example, ketones, esters, alcohols (e.g., alcohols having at least four carbons), and alkanes. In general, the ketones can be cyclic or acyclic, straight-chained or branched, and/or substituted or unsubstituted. Examples of acyclic ketones and cyclic ketones include methyl isobutyl ketone ("MIBK"), 3-methyl-2-pentanone(butyl methyl ketone), 4-methyl-2-pentanone (methyl isobutyl ketone), 3-methyl-2-butanone(methyl isopropyl ketone), 2-pentanone(methyl n-propyl ketone), diisobutyl ketone, 2-hexanone(methyl n-butyl ketone), 3-pentanone(diethyl ketone), 2-methyl-3-heptanone(butyl isopropyl ketone), 2-heptanone, 3-heptanone(ethyl n-butyl ketone), 4-heptanone, 2-octanone(methyl n-hexyl ketone), 5-methyl-3-heptanone(ethyl amyl ketone), 5-methyl-2-hexanone(methyl iso-amyl ketone), heptanone(pentyl methyl ketone), cyclo-pentanone, cyclo-hexanone.

In general, the esters can be cyclic or acyclic, straight-chained or branched, and/or substituted or unsubstituted. Examples of acyclic esters and cyclic esters include ethyl acetate, isobutyl acetate, propyl acetate, butyl acetate, amyl acetate, isoamyl acetate, hexyl acetate, ethyl butyrate, butyl isobutyrate, isobutyl butyrate, isobutyl isobutyrate, methyl n-butyrate, isoamyl butyrate, propyl propionoate, isopropyl propionoate, butyl propionate, isobutyl propionate, isoamyl propionoate, butyl butyrate, methyl valerate, ethyl valerate, propyl isovalerate, methyl caproate, ethyl butyrate, ethyl acetate, gamma-butyrolactone, gamma-valerolactone.

In general, the alcohols having at least four carbon atoms can be cyclic or acyclic, straight-chained or branched, and/or substituted or unsubstituted. Examples of such cyclic alcohols and acyclic alcohols include n-butanol, sec-butyl alcohol, methyl-1-butanol, ethyl-1-butanol, 3-methyl-1-butanol (amyl alcohol), 2-methyl-1-pentanol, 2-methyl-2-butanol (tert-amyl alcohol), 3-methyl-2-pentanol(methyl iso-butyl carbinol), methyl-2-pentanol, 4-methyl-2-pentanol, butyl alcohol, pentyl alcohol, 2-pentyl alocohol, hexyl alcohol, heptyl alcohol, cyclo-hexanol, methyl-cyclo-hexanol and fusel oil (a mixture of higher alcohols, which is often a by-product of alcohol distillation, and typically is predominantly amyl alcohol (methyl butanol)).

In general, the alkanes can be cyclic or acyclic, straight-chained or branched, and/or substituted or unsubstituted. In some embodiments, the alkanes include straight-chain alkanes and have five or more carbon atoms (e.g., heptane, hexane, octane, nonane, dodecane). In certain embodiments the alkanes include isoalkanes (e.g. methyl heptane, methyl octane, dimethyl heptane). In certain embodiments, Soltrol® 100 (a mixture of C9-C11 isoalkanes, commercially available from Chevron Phillips Chemical Company located in Houston, Tex.) can be used.

In some embodiments, the PHA extraction solvent is non-halogenated. Using a non-halogenated solvent can be advantageous because this can reduce the negative environmental impact of the solvent, reduce the health risks associated with using the solvent, and/or reduce the costs associated with storing, handling and/or disposing the solvent.

In certain embodiments, the PHA extraction solvent can have a relatively low density. For example, PHA extraction can have a density of less than about 0.95 kilograms per liter (e.g., less than about 0.9 kilograms per liter, less than about 0.8 kilograms per liter, less than about 0.7 kilograms per liter) at 20° C. Without wishing to be bound by theory, it is believed that using a relatively low density PHA extraction can enhance the quality of the separation of the PHA phase from the residual biomass phase.

In some embodiments, the PHA extraction solvent has a relatively low solubility in water. For example, PHA extraction solvent can have a solubility in water of less than about one percent (e.g., less than about 0.5 percent, less than about 0.2 percent) at 20° C. A PHA extraction solvent with a relatively low solubility in water can be desirable because such a solvent is less likely to intermix with water. This can enhance the ease of providing two separate phases during the process, thereby reducing the cost and/or complexity of the process.

In certain embodiments, the PHA extraction solvent is substantially non-hydrolyzable. For example, the solvent can be at most as hydrolyzable as ethyl acetate. Using a substantially non-hydrolyzable PHA extraction solvent can reduce the likelihood of undesirable side product formation (e.g., chemically reactive species, such as organic acids). This can reduce the amount and/or rate of, for example, corrosion of portions (e.g., plumbing) of the system in which the PHA extraction is performed.

In some embodiments, the PHA extraction solvent can have a higher boiling point than the PHA receiving solvent.

In some embodiments it can be desirable for the PHA extraction solvent to have a boiling point of at most about 200° C. (e.g., at most about 190° C., at most about 180° C., at most about 170° C., at most about 160° C., at most about 150° C.). While not wishing to be bound by theory, it is believed that using such a PHA extraction solvent can enhance the ease of drying the isolated PHA and thereby minimize the amount of undesirable residual solvent that is associated with the isolated PHA.

In certain embodiments, the PHA extraction solvent (e.g., MIBK) can further include a relatively small volume of a PHA receiving solvent (e.g., n-heptane). This added PHA receiving solvent is generally miscible with the PHA extraction solvent and can be the same or different as the PHA receiving solvent used to receive the isolated PHA. Without wishing to be bound by theory, it is believed that including a PHA receiving solvent in the PHA extraction solvent can reduce the viscosity of a solution (e.g., the PHA phase) containing the PHA and the PHA extraction solvent and/or enhance the selectivity of the process in extracting the desired PHA.

In some embodiments, the added PHA receiving solvent is different than the PHA receiving solvent used to receive the isolated PHA (e.g., embodiments having a PHA receiving solvent-1 for receiving the PHA and a PHA receiving solvent-2 that is added to the PHA extraction solvent).

In certain embodiments, the amount of PHA receiving solvent-2 is such that the vapor pressure maximum of the PHA extraction solvent/PHA receiving solvent-1 combination is not substantially altered. For example, the ratio of the volume of PHA receiving solvent added to the volume of PHA extraction solvent is less than about 0.10 (e.g., less than about 0.07, less than about 0.05, less than about 0.02).

In some embodiments, the PHA receiving solvent-2 can form a ternary azeotrope with the PHA extraction solvent and the PHA receiving solvent-1.

In some embodiments, the PHA receiving solvent-2 and the PHA extraction solvent can each form a binary azeotrope with the PHA receiving solvent-1. In certain embodiments, the binary azeotrope formed from the PHA receiving solvent-2/PHA receiving solvent-1 combination can have a boiling point within about 10° C. (e.g. within 8° C., within 6° C., within 5° C.) of the boiling point of the PHA extraction solvent/PHA receiving solvent-1 combination.

While not wishing to be bound by theory, it is believed that forming a ternary azeotrope (e.g., PHA extraction solvent/PHA receiving solvent-2/PHA receiving solvent-1) or a close boiling pair of binary azeotropes (e.g., PHA extraction solvent/PHA receiving solvent-1 and PHA receiving solvent-2/PHA receiving solvent-1) facilitates complete recovery of both the PHA extraction solvent and PHA receiving solvent-2 for efficient recycle and re-use, e.g., when the gaseous azeotropic mixture is condensed to form a third combination that includes the PHA extraction solvent, PHA receiving solvent-1, and PHA receiving solvent-2. In certain embodiments, the PHA receiving solvent-2 has a relatively low solubility or is immiscible with the PHA receiving solvent-1 to allow efficient separation and recycling (e.g. by decanting with the PHA extraction solvent after forming the third combination).

Useful PHA extraction solvent/PHA receiving solvent combinations include those in which the PHA receiving solvent is water and the PHA extraction solvent is a solvent that can form a minimum boiling azeotrope with water.

In some embodiments, the minimum boiling azeotrope can have a boiling point of from about 60° C. to about 99° C. at 1 atmosphere (atm) (e.g., from about 65° C. to about 95° C., from about 70° C. to about 95° C., from about 75° C. to about 95° C., from about 80° C. to about 95° C., from about 85° C. to about 95° C., from about 90° C. to about 95° C.). In some embodiments, the boiling point of the minimum boiling azeotrope can be at least about 10° C. less (e.g., at least about 20° C. less, at least about 30° C. less) than the melt temperature ($T_M$) of the PHA. While not wishing to be bound by theory, it is believed that such an azeotrope can minimize the likelihood of gel formation during the precipitation step. Again, while not wishing to be bound by theory, it is also believed that such an azeotrope can be removed at a pressure corresponding to a relatively modest vacuum (e.g., at least about 10 kPa (absolute), at least about 20 kPa (absolute), at least about 30 kPa (absolute)) and at a relatively low temperature (e.g., from about 30° C. to about 60° C.). This can minimize the likelihood of needing to perform a relatively energy intensive distillation to remove the PHA extraction solvent as a minimum boiling azeotrope with water. In some embodiments, the PHA extraction solvent has a boiling point greater than 100° C.

In certain embodiments, the PHA extraction solvent is non-halogenated, has relatively low (e.g., less than ethyl acetate) water solubility, and relatively low reactivity from the perspective of hydrolysis and/or from the perspective of reactivity towards the polymer.

In certain embodiments, the PHA extraction solvent is MIBK and forms a azeotrope with water having about a 25% water content and an azeotropic boiling point of about 88° C.

In general, the PHA extraction solvent is removed as an azeotropic mixture with the PHA receiving solvent by distillation or evaporation (e.g. multi-stage evaporation to effect substantially complete recovery of the PHA extraction solvent).

In some embodiments, the distillation or evaporation can be carried out at a pressure corresponding to a relatively modest vacuum. For example, the distillation or evaporation can be carried out at a pressure (absolute) of at most about 50 kiloPascals (kPa) (e.g., at most about 40 kPa, at most about 30 kPa, at most about 20 kPa, at most about 10 kPa).

In some embodiments, the distillation or evaporation can be carried out at a relatively low temperature. For example, the distillation or evaporation can be carried out at a temperature of at most about 60° C. (e.g., at most about 50° C., at most about 40° C., at most about 30° C., at most about 25° C., at most about 20° C.).

In some embodiments the PHA phase can be combined with the PHA receiving solvent prior to the start of the distillation or evaporation. In some embodiments, the PHA phase can be introduced into a system (e.g., a distillation or evaporative apparatus) containing the PHA receiving solvent, in which the system is maintained at a temperature and pressure that is sufficient to form and remove the PHA extraction solvent/PHA receiving solvent azeotropic mixture from the system in the gas phase (see, e.g., the FIGURE). In certain embodiments, the PHA phase can be introduced (e.g., injected) portionwise into the system. In some embodiments, it can be desirable to introduce the PHA phase into the system at a relatively slow rate. For example, the PHA phase can be introduced at a rate of at most about 2 gpm (gallon per minute) PHA phase per 100 gal of PHA receiving solvent (e.g., at most about 4 gpm/100 gal., at most about 3 gpm/100 gal., at most about 2 gpm/100 gal., at most about 1 gpm/100 gal., at most about 0.5 gpm/100 gal.). In some embodiments, the PHA phase can be introduced at a rate that is substantially similar to the rate at which the azeotropic distillate is collected.

In some embodiments, the PHA phase/PHA receiving solvent mixture is agitated during the distillation using high shear devices such as high shear impellers (e.g., a flat blade turbine). The shear rates are determined by the tip speeds of the various devices and can be varied between, for example, from about 100 revolutions per minute (rpm) to about 500 rpm (e.g., 300 rpm). Without wishing to be bound by theory, it is believed that the high shear mixing can, under certain conditions, improve the quality of the precipitated PHA.

In general, the PHA is received in solid form (e.g., as polymer granules, as a crystalline solid) in the PHA receiving solvent upon removal of the PHA extraction solvent from the PHA phase. In some embodiments, the PHA is received in solid form when the PHA extraction solvent is substantially removed from the PHA phase.

In some embodiments, the PHA receiving solvent is substantially free of gel or gel-like formations during the receiving of the PHA.

The PHA is then separated from the PHA receiving solvent. This separation can be performed by, for example, filtration or centrifugation (e.g., using a basket centrifuge, using a vacuum belt filter).

In some embodiments the PHA can be obtained as relatively incompressible and nonfibrous solid. While not wishing to be bound by theory, it is believed that such incompressible and nonfibrous solids have enhanced filtration and cake washing characteristics, thereby facilitating PHA isolation and purification, respectively. The suitability of the PHA solids for filtration and cake washing operations is characterized by the particle size distribution determined by screening the PHA solids through a set of screens stacked as a rack with the screens having the largest size openings on the top and the smallest size openings at the bottom. Typical screen deck sizes will range from about 0.25 millimeters (mm) to about 6 mm. After passing a representative sample of the PHA solids through the screen deck, the fractions are collected and weighed and expressed as a percentage of the total being retained on each screen deck. Typically the screen deck is affixed to a suitable shaker after loading the sample to the top screen to facilitate efficient fractionation. In some embodiments, the PHA solids will be relatively free of fines (e.g. less than about 10%, less than about 5%, less than about 2.5% of cumulative material of size less than about 0.25 mm) and also be relatively free of oversize material that could settle in equipment thereby causing blockages (e.g. less than 10%, 5%, 2.5% cumulative material of size greater than 5 mm). Suitable methods for determining particle size distribution using a screening test is disclosed in ASTM-D 1921-01. In some embodiments, the PHA can be obtained as a solid having a relatively high bulk density. For example the PHA can have a bulk density of at least about 0.200 kilograms (kg)/liter (L) or kg/cubic meter ($m^3$) (e.g., at least about 0.200 kg/L, at least about 0.250 kg/L, at least about 0.300 kg/L, at least about 0.350 kg/L, at least about 0.400 kg/L, at least about 0.450 kg/L, at least about 0.500 kg/L, at least about 0.600 kg/L). Bulk density can be determined using tapped bulk density measured in a measuring cylinder according to ASTM-D 527-93.

In some embodiments, the PHA can be obtained as polymer granules having a relatively large diameter. For example, the polymer granules can have a diameter of at least about 0.5 millimeters (mm) (e.g., at least about 1.0 mm, at least about 1.5 mm, at least about 2.0 mm, at least about 2.5 mm).

Typically, the precipitated PHA is then washed to assist removing undesired impurities, such as remaining solvents. In some embodiments, the polymer can be washed with a solvent (e.g., MIBK, methanol or mixtures of solvents). Usually, the composition for washing is selected to reduce (e.g., minimize) the re-dissolution of the PHA and/or to enhance (e.g., maximize) removal of impurities.

In certain embodiments, the isolated PHA can be further purified by washing with an alcohol (e.g. methanol) and using a countercurrent cascade (e.g., beginning with relatively impure methanol from a prior step and finishing with relatively pure methanol). In some embodiments, this washing step can be conducted at elevated temperature and appropriate residence time to further facilitate the washing and removal of impurities. In general, the total volume of PHA filter cake methanol washings can represent a relatively very small volume that can readily be re-purified (e.g. using filtration, activated carbon, flashing from non-volatile impurities or distillation) and re-used.

Typically, the washed, precipitated PHA is dried (e.g., at a temperature of from about 40° C. to about 100° C.). Drying can be performed under vacuum (e.g., to assist in facilitating recovery of the residual solvent). In certain embodiments it may be desirable to directly extrude the precipitated PHA still containing solvent in, for example, a devolatilizing extruder. Such extrusion can be performed, for example, at a temperature close to the polymer melting point, and the solvent can be recovered directly from the extruder. Water can optionally be injected under pressure into the devolatilizing extruder (e.g., to generate steam in-situ to facilitate efficient stripping and removal of traces of residual solvent). A gas stream (e.g. air, $CO_2$ or steam) can optionally be injected into the extruder (e.g., to facilitate solvent removal). Extrusion can consolidate drying and product formation (e.g. pelletizing) operations into a single unit with, for example, capital and process operating cost savings.

The azeotropic distillate can be further processed so that the PHA extraction solvent and PHA receiving solvent can be re-used. For example, in embodiments where the PHA receiving solvent is water and the PHA extraction solvent is a water immiscible solvent (e.g., MIBK), the two components can be separated by decanting, e.g., the upper PHA extraction solvent layer from the lower water layer.

In some embodiments, the biomass can be provided as a slurry. Typically, the slurry is provided by forming a fermentation broth containing water and the biomass, and removing a portion of the water from the fermentation broth. The water can be removed, for example, by filtration (e.g., microfiltration, membrane filtration) and/or by decanting and/or by using centrifugal force. In certain embodiments, biomass impurities, such as cell wall and cell membrane impurities, can be removed during the process of providing the slurry. Such impurities can include proteins, lipids (e.g., triglycerides, phospholipids, and lipoproteins) and lipopolysaccharides. In other embodiments, dry biomass can be used. In certain embodiments, the dry biomass can be combined with water to provide a slurry.

In some embodiments, the slurry has a solids content (e.g., dry biomass, inclusive of its PHA content, weight relative to total wet weight of slurry) of from about 15 weight percent to about 40 weight percent (e.g., from about 25 weight percent to about 35 weight percent).

The PHA content of the biomass (e.g., PHA content of the dry biomass, inclusive of its polymer content, on a weight percent basis) can be varied as desired. As an example, in embodiments in which the biomass is of microbial origin, the biomass can have a PHA content of at least about 50 weight percent (e.g., at least about 60 weight percent, at least about 70 weight percent, at least about 80 weight percent). As another example, in embodiments in which the biomass is of plant origin, the biomass can have a PHA content of less than about 50 weight percent (e.g., less than about 40 weight percent, less than about 30 weight percent, less than about 20 weight percent).

The biomass can be formed of one or more of a variety of entities. Such entities include, for example, microbial strains for producing PHAs (e.g., *Alcaligenes eutrophus* (renamed as *Ralstonia eutropha*), *Alcaligenes latus, Azotobacter, Aeromonas, Comamonas, Pseudomonads*), genetically engineered organisms for producing PHAs (e.g., *Pseudomonas, Ralstonia, Escherichia coli, Klebsiella*), yeasts for producing PHAs, and plant systems for producing PHAs. Such entities are disclosed, for example, in Lee, *Biotechnology & Bioengineering* 49:1-14 (1996); Braunegg et al., (1998), J. Biotechnology 65: 127-161; Madison and Huisman, 1999; and Snell and Peoples 2002, Metabolic Engineering 4: 29-40, which are hereby incorporated by reference.

In embodiments in which the biomass contains microbial cells, the size of the microbial cells contained in the biomass can also be varied as desired. In general, the microbial cells (e.g., bacterial cells) have at least one dimension with a size of at least about 0.2 micron (e.g., at least about 0.5 micron, at least about one micron, at least about two microns, at least about three microns, at least about four microns, at least about five microns). In certain embodiments, using relatively large microbial cells (e.g., relatively large bacterial cells) in the biomass can be advantageous because it can facilitate the separation of the biomass to form the biomass slurry.

In general, a PHA is formed by polymerization (e.g., enzymatic polymerization) of one or more monomer units. Examples of such monomer units include, for example, 3-hydroxybutyrate, glycolic acid, 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate, 3-hydroxytetradecanoate, 3-hydroxyhexadecanoate, 3-hydroxyoctadecanoate, 4-hydroxybutyrate, 4-hydroxyvalerate, 5-hydroxyvalerate, and 6-hydroxyhexanoate.

In some embodiments, the PHA has at least one monomer unit with the chemical formula —$OCR_1R_2(CR_3R_4)_nCO$—. n is zero or an integer (e.g., one, two, three, four, five, six, seven, eight, nine, 10, 11, 12, 13, 14, 15, etc.). Each of $R_1, R_2, R_3$ and $R_4$ is a hydrogen atom, a saturated hydrocarbon radical, an unsaturated hydrocarbon radical, a substituted radical (e.g., a substituted hydrocarbon radical) or an unsubstituted radical (e.g., an unsubstituted hydrocarbon radical). Examples of substituted radicals include halo-substituted radicals (e.g., halo substituted hydrocarbon radicals), hydroxy-substituted radicals (e.g., hydroxy-substituted hydrocarbon radicals), halogen radicals, nitrogen-substituted radicals (e.g., nitrogen-substituted hydrocarbon radicals) and oxygen-substituted radicals (e.g., oxygen-substituted hydrocarbon radicals). Substituted radicals include, for example, substituted, saturated hydrocarbon radicals and substituted, unsaturated hydrocarbon radicals. $R_1$ is the same as or different from each of $R_2, R_3$ and $R_4$. $R_2$ is the same as or different from each of $R_1, R_3$ and $R_4$. $R_3$ is the same as or different from each of $R_2$, $R_1$ and $R_4$, and $R_4$ is the same as or different from each of $R_2$, $R_3$ and $R_1$.

In some embodiments, the PHA is a copolymer that contains two or more different monomer units. Examples of such copolymers include poly-3-hydroxybutyrate-co-3-hydroxypropionate, poly-3-hydroxybutyrate-co-3-hydroxyvalerate, poly-3-hydroxybutyrate-co-3-hydroxyhexanoate, poly-3-hydroxybutyrate-co-4-hydroxybutyrate, poly-3-hydroxybutyrate-co-4-hydroxyvalerate, poly-3-hydroxybutyrate-co-6-hydroxyhexanoate, poly 3-hydroxybutyrate-co-3-hydroxyheptanoate, poly-3-hydroxybutyrate-co-3-hydroxyoctanoate, poly-3-hydroxybutyrate-co-3-hydroxydecanoate, poly-3-hydroxybutyrate-co-3-hydroxydodecanotate, poly-3-hydroxybutyrate-co-3-hydroxyoctanoate-co-3-hydroxydecanoate, poly-3-hydroxydecanoate-co-3-hydroxyoctanoate, and poly-3-hydroxybutyrate-co-3-hydroxyoctadecanoate.

In certain embodiments, the PHA is a homopolymer. Examples of such homopolymers include poly-4-hydroxybutyrate, poly-4-hydroxyvalerate, poly-3-hydroxypropionate, poly-3-hydroxybutyrate, poly-3-hydroxyhexanoate, poly-3-hydroxyheptanoate, poly-3-hydroxyoctanoate, poly-3-hydroxydecanoate and poly-3-hydroxydodecanoate.

The PHA can have a polystyrene equivalent weight average molecular weight of at least about 500 Daltons (e.g., at least about 10,000 Daltons, at least about 50,000 Daltons) and/or less than about 2,000,000 Daltons (e.g., less than about 1,000,000 Daltons, less than about 800,000 Daltons). As used herein, weight average molecular weight is determined by gel permeation chromatography, using e.g., chloroform as both the eluent and diluent for the PHA samples. Calibration curves for determining molecular weights can be generated using polystyrene molecular weight standards.

In general, the amount of PHA extraction solvent added to biomass can be varied as desired. In certain embodiments, an amount of PHA extraction solvent is added to the biomass so that, after centrifugation, the PHA phase has a PHA solids content of less than about 10 weight percent (e.g., less than about eight weight percent, less than about six weight percent, less than about five weight percent, less than about four weight percent, less than about three weight percent).

In certain embodiments in which the PHA is a poly-3-hydroxybutyrate copolymer (e.g., poly-3-hydroxybutyrate-co-3-hydroxypropionate, poly-3-hydroxybutyrate-co-3-hydroxyvalerate, poly-3-hydroxybutyrate-co-4-hydroxyvalerate, poly-3-hydroxybutyrate-co-3-hydroxyhexanoate and/or poly-3-hydroxybutyrate-co-4-hydroxybutyrate, poly-3-hydroxybutyrate-co-3-hydroxyoctanoate-co-3-hydroxydecanote-co-3-hydroxydodecanote), where the majority of the monomer units are 3-hydroxybutyrate (e.g., at least about 50% of the monomer units are 3-hydroxybutyrate, at least about 60% of the monomer units are 3-hydroxybutyrate), candidate PHA extraction solvents may be selected from ketones, esters or alcohols with at least four carbon atoms; and candidate PHA receiving solvents may be selected from alkanes, methanol, ethanol, or water In some embodiments, when the PHA is poly-3-hydroxybutyrate-co-4-hydroxybutyrate, the PHA extraction solvent can be MIBK, butyl acetate, and cyclohexanone. In some embodiments, when the PHA is PHB, poly-3-hydroxybutyrate-co-3-hydroxyvalerate, or poly-3-hydroxybutyrate-co-3-hydroxyhexanoate the PHA extraction solvent can be cyclohexanone, cyclopentanone or mixtures of MIBK and cyclohexanone. In general, the PHA receiving solvent can be water when the PHA extraction solvent includes ketones and esters having boiling points that are above about 100° C.

In some embodiments in which the PHA is poly-3-hydroxyoctanoate, the candidate PHA extraction solvents may be selected from ketones, esters, alcohols with at least four carbon atoms or alkanes (e.g., hexane); and candidate PHA receiving solvents may be selected from methanol, ethanol, or water.

In certain embodiments, contacting the biomass with the PHA extraction solvent can be performed with a relatively large amount of the PHA extraction solvent being transferred to the PHA phase. For example, in some embodiments a ratio of the volume of PHA extraction solvent recovered in the PHA phase to the volume of solvent contacted with the biomass is at least about 0.8 (e.g., 0.85, at least about 0.9, at least about 0.95, at least about 0.98, at least about 0.99). In some embodiments, a relatively large amount of PHA extraction solvent can be transferred to the PHA phase using, for example, countercurrent conditions during separation of the polymer (e.g., PHA) from the biomass.

In certain embodiments, contacting the biomass with the PHA extraction solvent can be performed with a relatively small amount of the PHA extraction solvent being transferred to the residual biomass phase. For example, in some embodiments a ratio of the volume of PHA extraction solvent recovered in the residual biomass phase to the volume of PHA extraction solvent contacted with the biomass is at most about 0.2 (e.g., at most about 0.15, at most about 0.1, at most about 0.05, at most about 0.02, at most about 0.01). In some embodiments, a relatively small amount of the PHA extraction solvent is transferred to the residual biomass phase using, for example, countercurrent conditions during separation of the polymer (e.g., PHA) from the biomass.

In general, the mixture containing the PHA extraction solvent and the biomass is heated to enhance the interaction of the PHA extraction solvent with the PHA, thereby allowing the PHA to be removed from the biomass.

In general, the temperature of the PHA extraction solvent and biomass during agitation can be varied as desired. In some embodiments, the temperature is less than about 160° C. (e.g., less than about 125° C., less than about 95° C., less than about 65° C.) and/or at least about 20° C. In certain embodiments, the temperature is from ambient temperature to about 95° C. (e.g., from about 40° C. to about 80° C., from about 60° C. to about 70° C.). In certain embodiments the pressure can be regulated to greater than atmospheric pressure to facilitate extraction at elevated temperature (e.g. greater than 1 atmosphere, up to 20 atmosphere).

Generally, the shear force used when agitating the PHA extraction solvent and biomass can be varied as desired. In certain embodiments, the PHA extraction solvent and biomass is agitated by stirring so that the dissolution time is reduced. In some embodiments, to assist dissolution, a high shear impeller and agitator (e.g. flat blade impeller such as the 6 bladed Rushton turbine) can be used at tip speeds of, for example, about five meters per second or more (e.g., to about 10 meters per second). In certain embodiments a high speed disperser having a low profile blade can be used at tip speeds of, for examples, about 10 meter per second or more (e.g. about 15 meter per second or more, about 20 meter per second to about 25 meter per second), Typically, the high speed dispersers have a blade with a low profile bladed or saw tooth edge to generate high shear at enhanced tip speeds. In certain embodiments, a rotor/stator system is used that generates relatively high shear (e.g., at tip speeds up to about 50 meters per second) in the gap between a high speed rotor that spins within a slotted stator. In general the geometry of the rotor and stator can be varied to suit particular applications and many designs are commercially available.

In general, the PHA extraction solvent and biomass is agitated until a centrifuged sample of the mixture has a PHA phase with a desired PHA solids content. In some embodiments, the PHA extraction solvent and biomass is agitated for less than about three hours (e.g., less than about two hours) and/or at least about one minute (e.g., at least about 10 minutes, at least about 30 minutes).

In certain embodiments, the PHA phase contains less than about 0.5 weight percent (e.g., less than about 0.25 weight percent, less than about 0.1 weight percent) biomass relative to the amount of dissolved PHA in the PHA phase.

In some embodiments, the biomass phase contains less than about 25 weight percent (e.g., less than about 20 weight percent, less than about 15 weight percent) of the PHA extraction solvent that was initially present and/or at least about one weight percent (e.g., at least about five weight percent, at least about 10 weight percent) of the PHA extraction solvent that was initially present.

In some embodiments, the PHA phase has a relatively low viscosity. For example, this phase can have a viscosity of less than about 100 centipoise (e.g., less than about 75 centipoise, less than about 50 centipoise, less than about 40 centipoise, less than about 30 centipoise). Without wishing to be bound by theory, it is believed that preparing the PHA phase such that it has a relatively low viscosity can result in a relatively good separation of the PHA phase from the residual biomass phase. In particular, it is believed that the rate of separation of the phases during centrifugation is inversely proportional to the viscosity of the PHA phase so that, for a given centrifugation time, decreasing the viscosity of the PHA phase results in an improved separation of the phases relative to certain systems in which the PHA phase has a higher viscosity.

In certain embodiments, the PHA phase has a relatively high polymer concentration. For example, the PHA phase can have a polymer concentration of at least about two percent (e.g., at least about 2.5 percent, at least about three percent, at least about 3.5 percent, at least about four percent, at least about 4.5 percent, at least about five percent).

Is some embodiments, separation of the polymer (e.g., PHA) from the biomass can be performed using a one-stage process. In general, a one-stage process is a process in which only one centrifugation step is used during separation of the polymer from the biomass. In general, a multi-stage process refers to a process in which more than one centrifugation step is used during separation of the polymer (e.g., PHA) from the biomass. For example, the residual biomass formed in the process in the FIGURE can be treated and ultimately centrifuged, thereby creating a two-stage process.

Various types of devices can be used that exploit centrifugal force. As an example, in some embodiments centrifugation is performed using a disc stack (e.g., a model SC-6, available from Westfalia Separator US, Inc., located in Northvale, N.J.). In certain embodiments centrifugation is performed using a decanter (e.g., a model CA-220, available from Westfalia Separator US, Inc., located in Northvale, N.J.). In some embodiments, a hydroclone can be used. In other embodiments a CINC separator (e.g. a CINC model V-02 available from Costner Industries, located in Houston, Tex.) can be used.

In certain embodiments a countercurrent centrifugal contacter (e.g., a Podbielniak centrifugal contacter, a Luwesta centrifugal contacter, a Westfalia countercurrent decanter, Taylor-Couette centrifugal contacter) can be used. In general, a countercurrent centrifugal contacter is used by having two (or possibly more) fluid streams contact each other. One stream (the solvent stream) begins as a fluid stream that is relatively rich in solvent. Another stream (the biomass stream) begins as a fluid stream that is relatively rich in PHA. The two streams contact each other under countercurrent conditions such that a portion of the solvent stream that is richest in solvent contacts a portion of the biomass stream that is poorest in PHA (to enhance, e.g., optimize, the recovery of PHA from the biomass stream), and/or such that a portion of the biomass stream that is richest in PHA contacts a portion of the solvent stream that is most laden with PHA (to enhance, e.g., optimize, the concentration of PHA in the solvent stream). In certain embodiments, this is achieved by flowing the solvent stream reverse to the biomass stream (reverse flow conditions). Countercurrent centrifugal contacters are available from, for example, B&P Process Equipment (Saginaw, Mich.) and Quadronics. Examples of commercially available countercurrent centrifugal contacters include the Podbielniak A-1 countercurrent centrifugal contacter (B&P Process Equipment) and the Podbielniak B-10 countercurrent centrifugal contacter (B&P Process Equipment).

In general, the conditions (e.g., force, time) used for centrifugation can be varied as desired.

In some embodiments in which a disc stack is used, centrifugation can be performed using at least about 5,000 RCF (Relative Centrifugal Force) (e.g., at least about 6,000 RCF, at least about 7,000 RCF, at least about 8,000 RCF) and/or less than about 15,000 RCF (e.g., less than about 12,000 RCF, less than about 10,000 RCF). In certain embodiments in which a decanter is used, centrifugation can be performed using at least about 1,000 RCF (e.g., at least about 1,500 RCF, at least about 2,000 RCF, at least about 2,500 RCF) and/or less than about 5,000 RCF (e.g., less than about 4,000 RCF, less than about 3,500 RCF). In certain embodiments in which a countercurrent centrifugal contacter is used, centrifugation can be performed using at least about 1,000 RCF (e.g., at least about 1,500 RCF, at least about 2,000 RCF, at least about 2,500 RCF) and/or less than about 5,000 RCF (e.g., less than about 4,000 RCF, less than about 3,500 RCF).

In some embodiments in which a disc stack is used, centrifugation can be performed for less than about one hour (e.g., less than about 30 minutes, less than about 10 minutes, less than about five minutes, less than about one minute) and/or at least about 10 seconds (e.g., at least about 20 seconds, at least about 30 seconds). In certain embodiments in which a decanter is used, centrifugation can be performed for less than about one hour (e.g., less than about 30 minutes, less than about 10 minutes, less than about five minutes, less than about one minute) and/or at least about 10 seconds (e.g., at least about 20 seconds, at least about 30 seconds). In certain embodiments in which a countercurrent centrifugal contacter is used, centrifugation can be performed for less than about one hour (e.g., less than about 30 minutes, less than about 10 minutes, less than about five minutes, less than about one minute) and/or at least about 10 seconds (e.g., at least about 20 seconds, at least about 30 seconds).

Methods for extracting PHAs from biomass are described in commonly owned U.S. patent application Ser. No. 10/265,861, filed on Jul. 23, 2003, and entitled "Polymer Extraction Methods," which is hereby incorporated by reference.

In certain embodiments, the process (or portions of the process) can be performed in a continuous and/or an in-line manner. As an example, the process can involve an in-line rotor/stator process for dissolution, and/or an in-line rotor/stator process for precipitation of the PHA and/or an in-line devolatilizing extruder (e.g. a Werner and Pfleiderer ZSK extruder supplied by Coperion Corporation of Ramsey, N.J.) for removing the solvent and forming PHA solids (e.g. pellets).

In some embodiments, the process uses the PHA extraction solvent and/or the PHA receiving solvent in a relatively efficient manner. For example, at least about 90 volume percent (e.g., at least about 95 volume percent, at least about 97 volume percent, at least about 98 volume percent) of the solvent initially used can be recovered for re-use.

The following examples are illustrative and not intended to be limiting.

Example 1

*E. coli* cell paste containing 30% washed dry solids containing 80% PHB-co-4HB with 11% 4HB comonomer content was extracted by contacting with MIBK at 80° C. and separated by centrifugation to yield a solution containing 4% dissolved polymer. A total of 100 mL of this solution was then slowly injected into a 2 L baffled round bottom flask using a glass syringe with a 12" 18 gauge needle at a rate of 2 ml/min. The flask contained 1 L of boiling DI water at 30° C. under vacuum of 80 mbar. The flask was equipped with an agitator fitted with a 50 mm diameter, 45°, teflon pitch blade impeller. An IKA Eurostar overhead stirrer was used to agitate the contents at 300 rpm.

The solution was injected at a rate of 2 ml/min to approximately match the rate at which the distillate was collected. The solvent was condensed and 75 ml of MIBK was recovered. The remaining solvent was dissolved in the water or lost via the vacuum pump. The result was a suspension of polymer granules approximately 0.5-2.0 mm in diameter. A total of 6.3 g of wet polymer was collected by filtration and yielded 3.7 g of dry polymer (58.7% solid) with little residual solvent odor. The dry bulk density was measured to be 0.450 kg/L which is significantly higher than the 0.125 kg/L obtained when the polymer is precipitated into hexane or heptane non-solvent.

Example 2

Samples of the precipitated polymer from Example 1 were washed using warm methanol in an agitated beaker at 40° C. for 20 minutes and then dried in vacuo. Films were pressed using the dried Sample form Example 1 and the dried sample after the methanol wash step using a Carver Press at 185° C. and the results are presented in Table 1.

TABLE 1

| Film Sample | Clarity | Color |
| --- | --- | --- |
| Example 1 | Slight haze | Light yellow color |
| Example 2 | Clear film | No color |

Other embodiments are in the claims.

What is claimed is:

1. A method of isolating a PHA from a biomass containing the PHA, the method comprising:
   contacting the biomass with a PHA extraction solvent to form a first combination comprising a PHA phase and a residual biomass phase;
   separating the PHA phase from the residual biomass phase;
   introducing the PHA phase into a PHA receiving solvent, thereby forming a second combination, wherein the PHA extraction solvent is capable of forming a minimum boiling azeotrope with the PHA receiving solvent;
   maintaining the second combination at a temperature and pressure such that the PHA extraction solvent of the PHA phase and a portion of the PHA receiving solvent are removed from the second combination in the gaseous state as an azeotropic mixture; and
   precipitating the PHA from the second combination when the PHA extraction solvent is substantially removed from the second combination;
   wherein:
      the PHA extraction solvent is selected from the group consisting of ketones, esters, alcohols and alkanes;
      the PHA receiving solvent is water; and
      the PHA extraction solvent has a higher boiling point than the PHA receiving solvent.

2. The method of claim 1, wherein the minimum boiling azeotrope forms at a temperature below the boiling point of the PHA receiving solvent.

3. The method of claim 1, wherein the precipitating comprises forming granules of the PHA.

4. The method of claim 3, wherein the PHA granules have a bulk density of at least about 0.25 kg/m$^3$.

5. A method of isolating a PHA, the method comprising:
   combining the PHA, a PHA extraction solvent and a PHA receiving solvent to form a combination, the PHA extraction solvent being capable of forming a minimum boiling azeotrope with the PHA receiving solvent; and
   maintaining the combination at a temperature and pressure such that the PHA extraction solvent is substantially removed and a portion of the PHA receiving solvent is removed from the combination in the gaseous state as a minimum boiling azeotropic mixture; and
   precipitating the PHA from the combination as PHA granules;
   wherein:
      the PHA extraction solvent is selected from the group consisting of ketones, esters, alcohols and alkanes;
      the PHA receiving solvent is water; and
      the PHA extraction solvent has a higher boiling point than the PHA receiving solvent.

6. The method of claim 5, wherein the PHA granules have a bulk density of at least about 0.25 kg/m$^3$.

7. The method of claim 5, wherein the minimum boiling azeotrope forms at a temperature below the boiling point of the PHA receiving solvent.

8. The method of claim 5, wherein the precipitating the PHA comprises:
   reducing the temperature of the combination after substantially removing the PHA extraction solvent and removing at least a part of the PHA receiving solvent as the minimum boiling azeotropic mixture.

9. The method of claim 8, wherein the combining comprises:
   combining the PHA and the PHA extraction solvent to form a first combination; and
   combining the first combination with the PHA receiving solvent to form the combination.

10. The method of claim 1, wherein the first combination is formed by agitating the biomass and the PHA extraction solvent.

11. The method of claim 1, wherein the PHA extraction solvent is a single solvent and forms a binary azeotrope with a single PHA receiving solvent.

12. The method of claim 1, wherein the PHA extraction solvent is MIBK, 2-pentanone, 3-pentanone, cyclopentanone, cyclohexanone or butyl acetate.

13. The method of claim 12, wherein the PHA extraction solvent is MIBK.

14. The method of claim 10, wherein the agitating is effected by stirring.

15. The method of claim 5, wherein the PHA extraction solvent is a single solvent and forms a binary azeotrope with a single PHA receiving solvent.

16. The method of claim 5, wherein the PHA extraction solvent is MIBK, 2-pentanone, 3-pentanone, cyclopentanone, cyclohexanone or butyl acetate.

17. The method of claim 16, wherein the PHA extraction solvent is MIBK.

* * * * *